United States Patent
Chen et al.

(10) Patent No.: US 8,773,750 B2
(45) Date of Patent: Jul. 8, 2014

(54) OPTICAL COUPLING DEVICE HAVING KBBF GROUP CRYSTAL COUPLED WITH PRISMS AND METHOD FOR MANUFACTURING SAME

(75) Inventors: Chuangtian Chen, Beijing (CN); Yong Zhu, Beijing (CN); Feidi Fan, Beijing (CN); Xiaoyang Wang, Beijing (CN); Rukang Li, Beijing (CN)

(73) Assignee: Technical Institute of Physics and Chemistry, Chinese Academy of Sciences, Beijing (CN)

( * ) Notice: Subject to any disclaimer, the term of this patent is extended or adjusted under 35 U.S.C. 154(b) by 0 days.

(21) Appl. No.: 14/115,261

(22) PCT Filed: Mar. 21, 2012

(86) PCT No.: PCT/CN2012/000355
§ 371 (c)(1),
(2), (4) Date: Nov. 1, 2013

(87) PCT Pub. No.: WO2012/149826
PCT Pub. Date: Nov. 8, 2012

(65) Prior Publication Data
US 2014/0071519 A1    Mar. 13, 2014

(30) Foreign Application Priority Data
May 3, 2011   (CN) .......................... 2011 1 0112761

(51) Int. Cl.
    *G02F 1/355*    (2006.01)
(52) U.S. Cl.
    USPC ............................................ 359/328; 385/36

(58) Field of Classification Search
    USPC ...................................... 359/326–332; 385/36
    See application file for complete search history.

(56) References Cited

U.S. PATENT DOCUMENTS

| | | | | |
|---|---|---|---|---|
| 3,675,985 A | * | 7/1972 | Gloge | 359/328 |
| 5,640,480 A | * | 6/1997 | Komine | 385/122 |
| 6,215,580 B1 | * | 4/2001 | Kouta | 359/328 |
| 6,859,305 B2 | * | 2/2005 | Chen et al. | 359/326 |

* cited by examiner

*Primary Examiner* — Daniel Petkovsek
(74) *Attorney, Agent, or Firm* — Christie, Parker & Hale, LLP

(57) ABSTRACT

The present invention relates to a KBBF family nonlinear optical crystal-prism coupler and its method of fabrication. The coupler comprises: a KBBF family crystal with two smooth surfaces; transition layers each of which is deposited on respective one of the two smooth surfaces of the KBBF family crystal; and a pair of prisms each of which optically contacts with respective one of the activated transition layers. The present invention further provides a KBBF family nonlinear optical crystal-prism coupler that comprises: a KBBF family crystal with two smooth surfaces; a pair of prisms each of which has a smooth surfaces; first transition layers each of which is deposited on respective one of the two smooth surfaces of the KBBF family crystal; and second transition layers each of which is deposited on a smooth surface of respective one of the pair of prisms, wherein the first and second transition layers are integral by optical contact. The coupling between the KBBF family crystal and the prisms is achieved by optical contact through transition layers to improve bonding strength.

23 Claims, 3 Drawing Sheets

OPTICAL COUPLING DEVICE HAVING KBBF GROUP CRYSTAL COUPLED WITH PRISMS AND METHOD FOR MANUFACTURING SAME

CROSS-REFERENCE TO RELATED APPLICATION(S)

This application is a National Phase Patent Application and claims priority to and benefit of International Application Number PCT/CN2012/000355, filed on Mar. 21, 2012, which claims priority to and benefit of Chinese Patent Application Number 201110112761.2, filed on May 3, 2011, the entire disclosures of which are incorporated herein by reference.

BACKGROUND OF THE INVENTION

1. Field of the Invention

The present invention relates to an optical coupler, especially to a KBBF family nonlinear optical crystal-prism coupler.

2. Description of the Related Art

Two or more optical components are generally bonded together in an optical system. Generally, there are three following methods: optical adhesive bonding, optical direct bonding and diffusion bonding. The optical adhesive bonding bonds two polished mirror surfaces with optical adhesive. This technique is simple and can be used to bond different optical materials. There is a disadvantage that any intermediate bonding material may form flaw and stains on the surfaces, affecting the quality of devices. Furthermore, it is difficult to achieve an optical adhesive of which refractive index completely consists with that of the optical components, especially when the two optical components are different optical materials. Light unavoidably suffers Fresnel reflection and thus loses light flux while travelling through interfaces of the components and adhesive. Finally, a bonding force of optical adhesive is insufficient. Especially, the optical adhesive is liable to be softened, deformed and even crack under heat in a laser system. Therefore, the optical adhesive is easy to cause optical damage under a high laser power so as to affect application.

The second method is the optical direct bonding. This is a technique to bond optical components with ultra-smooth surfaces without aiding of any adhesive and also referred to as "optical contact". The principle is that two sufficiently smooth surfaces are close to each other and the molecules of them are closely adjacent to each other, so that the smooth surfaces form a small distance therebetween and attract each other due to an electromagnetic interaction. Smoother the surfaces are, then closer the molecules are, and stronger the interaction is. A resultant force of this molecular interaction is even stronger than the adhesive force of optical adhesive of the first method. Optical direct bonding is widely applicable for the bonding between the same two optical materials. However, if the two optical components for bonding are of different optical materials or of the same optical material with different surface structures, inconsistent expansion will result in the separation of the two components due to the difference in thermal expansion coefficient when the interface is heated. This phenomenon is particularly common in a high-power laser system.

In view of the above, optical direct bonding between different materials is generally limited to be used in a low-power laser system. For example, a 532 nm green laser crystal assembly, which is made of a current common laser crystal (Nd: $YVO_4$) and a nonlinear frequency doubling crystal KTP by optical direct bonding, can generate more than 70 mW green laser when the laser diode pump has a power of 500 mW.

The third method is high-temperature diffuse bonding. This method performs the common optical contact followed by high-temperature heat treatment so that the two optical components occur high-temperature diffusion of atoms near an interface thereof so as to enhance the bonding force. This method is generally used for bonding optical materials of the same type. For example, undoped YAG crystals optically contact with two ends of a doped YAG crystal laser bar by bonding through high-temperature treatment so as to improve the thermal performance of the laser bar.

KBBF family crystal is a unique nonlinear optical material that can achieve deep ultraviolet harmonic light output by a direct frequency doubling method. A coupling technique for optically contacting a nonlinear optical crystal with prisms (PCT) and a device using the coupling technique have been invented (ZL 01115313.X; U.S. Pat. No. 6,859,305B2; Japanese Patent 4074124), in order to solve a difficulty in cutting a KBBF family crystal with a layered structure in a phase matching direction. The coupling technique makes the crystal to achieve practical and precise deep ultraviolet frequency doubling functions, such as high efficiency, high light beam quality, wide tuning etc.

In current optical processing field, a KBBF family crystal and $CaF_2$ crystal prisms or quartz glass prisms are coupled by common optical contact to fabricate a KBBF family crystal-prism coupler. The crystal and the prisms are of different materials, the binding force therebetween is insufficient, and thermal properties such as thermal expansion coefficients of two materials at the interface, etc. are different. Therefore, the two optical components may suffer different thermal expansions to be separated or appear interface damage. Especially, a high-power laser system has high laser power, long duration, poor heat dissipation at the interface, and is generally damaged primarily at the interface due to over-high temperature. As a result, laser beam quality degrades, and the two interfaces may separate from each other to cause the high-power laser system disable. In addition, to, it is advantageous to bond multiple KBBF family crystals by optical contact bonding in order to increase the effective path length of light. Further, compose of the KBBF family crystal is complex and there are many atomic species. Accordingly, the KBBF family crystal has complex thermal property, which is also called as poor optical contact ability. In the high-power laser system, the interfaces are also damaged at first and the two interfaces separate from each other if it is worse.

SUMMARY OF THE INVENTION

The present invention has been made to overcome the above problem that the bonding force of optical contact is insufficient between the KBBF family crystal and prisms of the existing KBBF family crystal-prism coupler by providing a KBBF family nonlinear optical crystal-prism coupler and its fabrication method. Here, the KBBF family crystal and the prisms are coupled by optical contact through transition layers, which belongs to bonding between the same type of materials. This could intensify the ability of bonding. Furthermore, there is no cavity in the bonding region and the bonding strength is enhanced enormously. The present invention is achieved by a simple process with low cost. It can be applied to fabricate laser optical components to improve the device performance and the laser damage resist threshold.

The object of the present invention is achieved as following:

The present invention provides a KBBF family nonlinear optical crystal-prism coupler that comprises:

a KBBF family crystal with two smooth surfaces;

transition layers each of which is deposited on respective one of the two smooth surfaces of the KBBF family crystal; and two prisms each of which optically contacts with respective one of the activated transition layers, wherein the transition layers are in thickness of 200 nm-1000 nm, and the materials of the transition layers and the prisms can be identical or different;

the smooth surfaces of the KBBF family crystal are crystallographic c-plane;

each of the smooth surfaces of the KBBF family crystal has a roughness of Ra less than 0.5 nm and a surface flatness less than $\frac{1}{8}\lambda$ ($\lambda$=632.8 nm); and the KBBF family crystal is a single KBBF family crystal or a combination of several layers of KBBF family crystals, which are combined by optically contact through the transition layers, the transition layers are coatings of different materials from that of the KBBF family crystal.

The present invention further provides a fabrication method for the above KBBF family nonlinear optical crystal-prism coupler that comprises the steps of:

processing two optical contact surfaces of a KBBF family crystal and optical contact surfaces of two prisms by fine polishing so that each of the fine-polished surfaces of the KBBF family crystal and the prisms has a roughness of Ra less than 0.5 nm and a surface flatness of less than $\frac{1}{8}\lambda$ ($\lambda$=632.8 nm);

depositing the transition layers on both the fine-polished surfaces of the KBBF family crystal, in which the transition layers are in thickness of 200 nm-1000 nm and the materials of the transition layers and the prisms can be identical or different and the transition layers are formed of calcium fluoride or silicon dioxide;

activating the transition layers of the KBBF family crystal; and bonding the transition layers deposited on the KBBF family crystal and the optical contact surfaces of the prisms by optical contact and then heating the bonded crystal-prism coupler at an elevated temperature to ensure that the crystal and the prisms are bonded to each other firmly, thereby achieving the KBBF family nonlinear optical crystal-prism coupler, wherein the heating process is performed under 50-600° C. for 1-120 hours, the atmosphere of the heat treatment can be air, inert, reducing or oxidizing gas.

The KBBF family crystal is $KBe_2BO_3F_2$ crystal, $RbBe_2BO_3F_2$ crystal or $CsBe_2BO_3F_2$ crystal.

The prisms are made of optical crystal or optical glass. The optical crystal prisms are made of calcium fluoride and the optical glass prisms are made of fused silica. The transition layers are formed of calcium fluoride or silicon dioxide.

The depositing process is chemical vapor deposition, physical vapor deposition or sputter deposition.

The present invention can also be achieved by providing another KBBF family nonlinear optical crystal-prism coupler, which comprises:

a KBBF family crystal with two smooth surfaces;

a pair of prisms each of which has a smooth surface;

first transition layers each of which is deposited on respective one of the two smooth surfaces of the KBBF family crystal; and second transition layers each of which is deposited on a smooth surface of respective one of the pair of prisms, wherein the first transition layers deposited on both the smooth surfaces of the KBBF family crystal are optically bonded with the second transition layers deposited on both the smooth surfaces of the two prisms;

the first and second transition layers are in thickness of 200 nm-1000 nm, the materials of the first and second transition layers and the KBBF family crystal are of different materials of the same type of optical substances, and the materials of the first and second transition layers and the prisms are of the same optical material of calcium fluoride or silicon dioxide;

the smooth surfaces of the KBBF family crystal are crystallographic c-plane;

each of the smooth surfaces of the KBBF family crystal and the prisms has a roughness of Ra less than 0.5 nm and a surface flatness less than $\frac{1}{8}\lambda$ ($\lambda$=632.8 nm); and the KBBF family crystal is a single KBBF family crystal or a combination of several layers of KBBF family crystals, which are combined by optical contact through the transition layers, the transition layers are coatings of different material from that of the KBBF family crystal.

The KBBF family crystal is $KBe_2BO_3F_2$ crystal, $RbBe_2BO_3F_2$ crystal or $CsBe_2BO_3F_2$ crystal.

The prisms are made of optical crystal or optical glass. The optical crystal prisms are made of calcium fluoride and the optical glass prisms are made of fused silica. The transition layers are formed of calcium fluoride or silicon dioxide.

The present invention further provides a fabrication method for the above KBBF family nonlinear optical crystal-prism coupler that comprises steps of:

processing two optical contact surfaces of a KBBF family crystal and optical contact surfaces of two prisms by fine polishing so that each of the fine-polished surfaces of the KBBF family crystal and the prisms has a roughness of Ra less than 0.5 nm and a surface flatness less than $\frac{1}{8}\lambda$ ($\lambda$=632.8 nm);

depositing each of the first transition layers on respective one of the fine-polished surfaces of the KBBF family crystal and each of the second transition layers on respective one of the fine-polished surfaces of the prisms, in which the first and second transition layers are in thickness of 200 nm-1000 nm, the materials of the first and second transition layers and the KBBF family crystal are of different materials of the same type of optical substances, and the materials of the first and second transition layers are of the same material of calcium fluoride or silicon dioxide;

activating the first and second transition layers; and bonding one of the first transition layers deposited on the KBBF family crystal and the second transition layer of the respective prism by optical contact, bonding the other first transition layer and the second transition layer of the other prism by optical contact, and then heating the bonded crystal-prism coupler at an elevated temperature to ensure that the crystal and the prisms are bonded to each other firmly, thereby achieving the KBBF family nonlinear optical crystal-prism coupler, wherein the heating process is performed under 50-600° C. for 1-120 hours, the atmosphere of the heat treatment can be in air, inert, reducing or oxidizing gas.

The KBBF family crystal is $KBe_2BO_3F_2$ crystal, $RbBe_2BO_3F_2$ crystal or $CsBe_2BO_3F_2$ crystal.

The prisms are made of optical crystal or optical glass. The optical crystal prisms are calcium fluoride prisms and the optical glass prisms are fused silica glass prisms.

The depositing process is chemical vapor deposition, physical vapor deposition or sputter deposition. The activating process is plasma activation or mechanical polishing activation.

The first and second transition layers are formed of calcium fluoride or fused silica.

In the present invention, the KBBF family crystal and the prisms are coupled together by optical contact through transition layers, which belongs to the optical contact between the same materials. In this way, the present invention provides a stronger ability for optical contact, giving a bonding force larger than that from normal optical direct bonding.

The above optical contact process is similar to the usual optical direct bonding process. It must maintain highly cleanliness and follow certain steps: thoroughly cleaning two optical contact surfaces, which includes removal of the residual polishing powder or other contamination, wiping off all fiber wires from the optical contact surfaces with a clean towel or chamois by hand or ultrasonically cleaning on the optical contact surfaces under illumination of a microscope illuminator, and removing fiber wires by an electrostatic universal brush, otherwise absorbed by charged elements; inspecting a cleaning degree to be achieved on the surfaces with expired air and determining a cleaned surface if the surface presents gray; and re-inspecting the two cleaned surfaces under monochromatic light, and then making the two surfaces to lightly contact to each other so that they will optically contact automatically. If there are no or many stripes on the surfaces, this means that there are fiber wires or dust or other contamination on the optical surfaces. Thereby, the surfaces should be cleaned again by the electrostatic brush and in optical contact again. All expanded stripes shall present grey if the optical contact is desirable. The entire process is preferably performed in a clean workshop with a clean bench.

The combination of the components then may go through a heat treatment in a high-temperature furnace as required so as to further enhance the bonding force between the KBBF family crystal and the prisms through the transition layers. The method according to the present invention is similar to bonding of the same type of materials in that a bonded combination is placed in an oven or a high-temperature furnace to be heated therein and then cooled slowly so as to achieve bonding. The furnace atmosphere is air, inert, reducing or oxidizing gas.

The present invention provides a KBBF family nonlinear optical crystal-prism coupler and its fabrication method. Such an optical contact with transition layers used by the invention can be referred to as "deeply optical contact". The present invention is advantageous in that an enhanced optical contact is achieved and there has no cavity in the bonding area as to a KBBF family crystal and other optical crystal or optical glass, or a KBBF family crystal and a KBBF family crystal. The bonding strength of the present invention is greatly improved than common optical contact. Furthermore, the present invention employs a simple process with low cost. It can be used to fabricate laser optical components to reduce thermal effect, improve the device performance and the laser damage resist threshold.

DETAILED DESCRIPTION OF THE EMBODIMENTS

Figure 1:
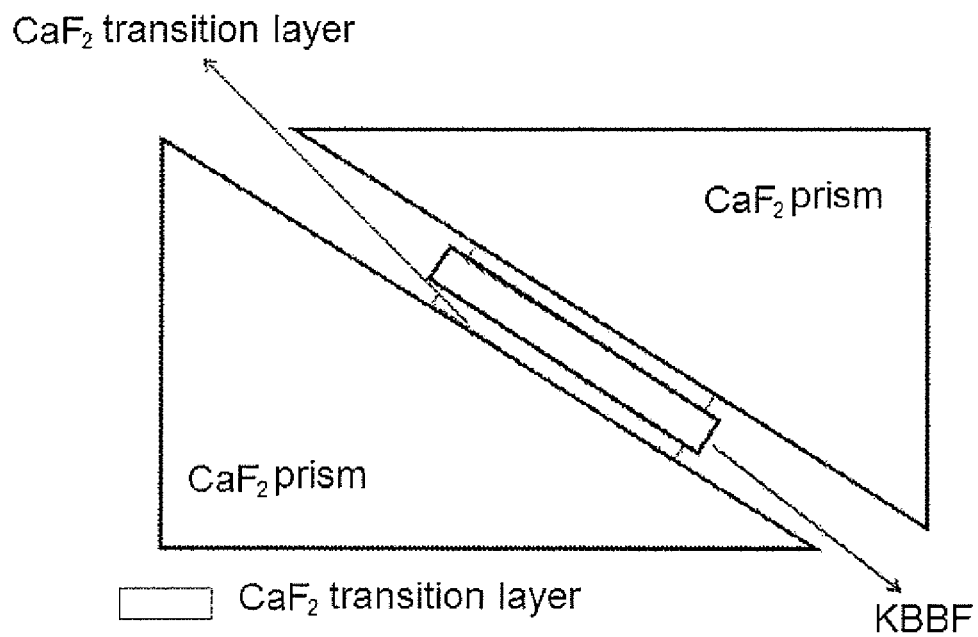
FIGS. 1-4 are schematic views illustrating structures of KBBF family nonlinear optical crystal-prism couplers, respectively.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Embodiment 1

The Fabrication of a KBBF-Calcium Fluoride ($CaF_2$) Crystal-Prism Coupler

The KBBF-$CaF_2$ crystal-prism coupler for coherent light output of 177.3 nm shown in FIG. 1 is fabricated by the following process.

First of all, two optical contact surfaces of a KBBF family crystal and optical contact surfaces of two $CaF_2$ prisms are polished precisely to form ultra-smooth surfaces. The smooth surfaces of the KBBF family crystal and the prisms have surface roughness Ra of less than 0.5 nm and surface flatness of less than $\frac{1}{8}\lambda$ ($\lambda$=632.8 nm).

Each of both polished surfaces of the KBBF family crystal is then deposited respectively by a layer of $CaF_2$ film, which has a thickness in a range of 200 nm-250 nm. Vapor deposition is applied to the $CaF_2$ film by ion beam assisted electron beam evaporation. After activating the $CaF_2$ coatings by mechanical polishing, the two coated surfaces of KBBF crystal bond with $CaF_2$ crystal prisms by optical contact. The bonded KBBF-$CaF_2$ crystal-prism coupler is clamped firmly at two ends with a certain force by a clamp. After that, the coupler is heated in a furnace at 50° C. for 120 hours. The heat treatment is performed in air. After a period of time of this heat treatment, the KBBF-$CaF_2$ crystal-prism coupler in this embodiment is fabricated by deeply optical contact.

Embodiment 2

The Fabrication of a KBBF-Fused Silica ($SiO_2$) Prism Coupler

Figure 2:
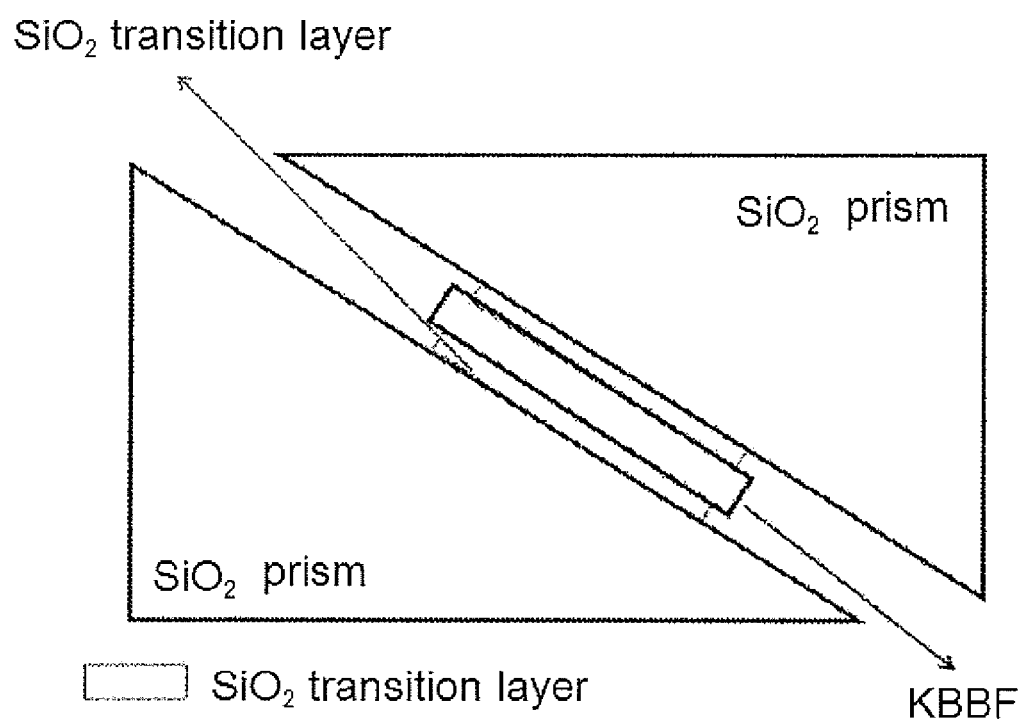

The KBBF-fused silica prism coupler for coherent light output of 193 nm shown in FIG. 2 is fabricated by a way similar to Embodiment 1. The difference is in that the transition layers deposited on the surfaces of KBBF crystal are $SiO_2$ films and both fused silica prisms are $SiO_2$ films. The $SiO_2$ films are in thickness of 300 nm-320 nm. Vapor deposition is applied to the $SiO_2$ films by ion beam assisted electron beam evaporation. The four $SiO_2$ films coated on the KBBF crystal and fused silica prisms are activated by mechanical polishing. The KBBF crystal then optically contacts with fused silica glass prisms (with composition of $SiO_2$) through $SiO_2$ films on respective surfaces. The bonded crystal-prism coupler is clamped firmly at two ends with a certain force by a clamp. After that, the coupler is heated in a furnace at 100° C. for 80 hours in an atmosphere of argon. The KBBF-fused silica prism coupler in this embodiment is fabricated by deeply optical contact after a period of time for heating.

Embodiment 3

The Fabrication of a KBBF-$CaF_2$/$SiO_2$ Prism Coupler

Figure 3:
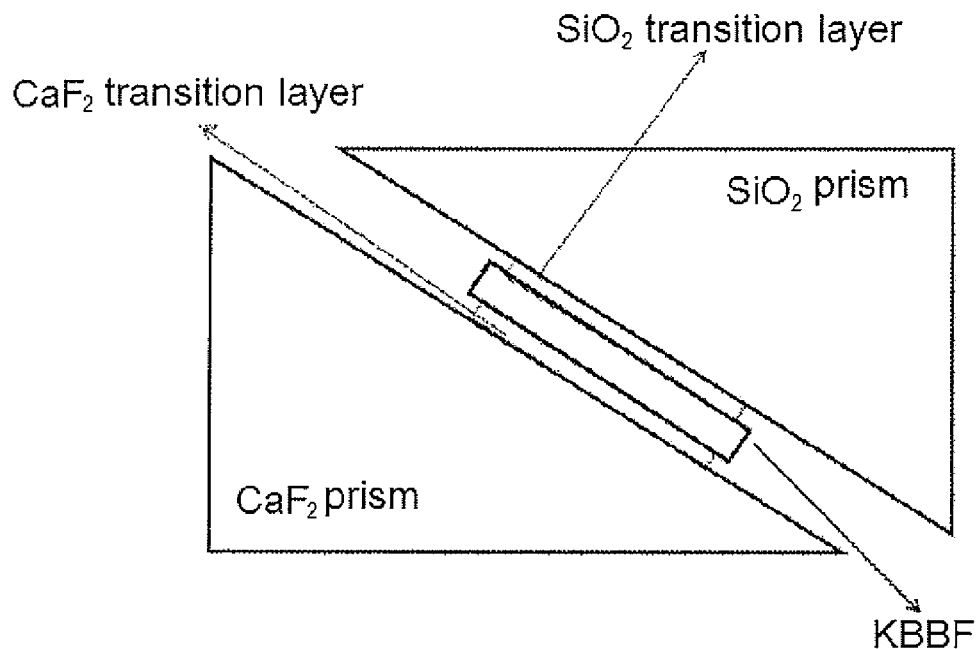

The KBBF-$CaF_2$/$SiO_2$ prism coupler for coherent light output of 177.3 nm shown in FIG. 3 is fabricated by a way similar to Embodiment 1. Embodiment 3 is different from Embodiment 1 in that: one of the transition layers deposited on one of the two surfaces of the KBBF crystal is $CaF_2$ film, and the other transition layer deposited on the other surface of the KBBF crystal is $SiO_2$ film; a $CaF_2$ film and a $SiO_2$ film are coated on the $CaF_2$ prism and the $SiO_2$ prism, respectively; the $CaF_2$ films are in thickness of 500 nm-550 nm and the $SiO_2$ films are in thickness of 600 nm-700 nm. Vapor deposition is applied to the $CaF_2$ and $SiO_2$ films by ion beam assisted electron beam evaporation. The deposited $CaF_2$ films and $SiO_2$ films are activated by plasma, then one surface of the KBBF crystal optically contacts with the $CaF_2$ crystal prism through the $CaF_2$ films, the other surface of the KBBF crystal optically contacts with the fused silica glass (with composition of $SiO_2$) prism through the $SiO_2$ films. The bonded crystal-prism coupler is clamped firmly at two ends with a certain force by a clamp. After that, the coupler is heated in an electric resistance furnace at 300° C. for 50 hours in an oxidizing atmosphere of a gas mixture composed of 40% $O_2$ and 60% $N_2$. The heated KBBF-$CaF_2$/$SiO_2$ prism coupler in this embodiment is fabricated by deeply optical contact.

Embodiment 4

The Fabrication of a RBBF-$CaF_2$ Prism Coupler

The structure of the RBBF-$CaF_2$ prism coupler is similar to that shown in FIG. 1. Front and back surfaces of a RBBF crystal are deposited respectively by a $CaF_2$ film with a certain thickness. The $CaF_2$ films are in thickness of 700 nm-760 nm for the application of tunable coherent light output of 175 nm-2230 nm. Vapor deposition is applied to the $CaF_2$ films by ion beam assisted electron beam evaporation. The is two $CaF_2$ films deposited on the RBBF crystal are activated by mechanical polishing, then the two coated surfaces of the RBBF crystal optically contact with $CaF_2$ prisms through the $CaF_2$ films. The bonded crystal-prism coupler is clamped firmly at two ends with a certain force by a clamp. After that, the coupler is heated in an electric resistance furnace at 400° C. for 30 hours in a reductive atmosphere of a gas mixture composed of 6% $H_2$ and 94% $N_2$. The RBBF-$CaF_2$ crystal-prism coupler in this embodiment is fabricated by deeply optical contact.

Embodiment 5

The Fabrication of a CBBF-$CaF_2$ Prism Coupler

The structure of the CBBF-$CaF_2$ prism coupler is similar to that shown in FIG. 1. Optical contact surfaces of a CBBF crystal and $CaF_2$ crystal prisms are deposited respectively by a $CaF_2$ film with a certain thickness. The $CaF_2$ films are in thickness of 800 nm-850 nm for the application of coherent light output of 266 nm. Vapor deposition is applied to the $CaF_2$ films by ion beam assisted electron beam evaporation. The two $CaF_2$ films deposited on the CBBF crystal are activated by plasma. The two coated surfaces of CBBF crystal optically contact with two $CaF_2$ films on the $CaF_2$ crystal prisms, which are activated by plasma as well. The bonded crystal-prism coupler is clamped firmly at two ends with a certain force by a clamp. The coupler is heated in an electric resistance furnace at 500° C. for 15 hours in air. The CBBF-$CaF_2$ crystal-prism coupler in this embodiment is fabricated by deeply optical contact after the heat treatment.

Embodiment 6

The Fabrication of a KBBF-$CaF_2$ Crystal Prism Coupler

Figure 4:
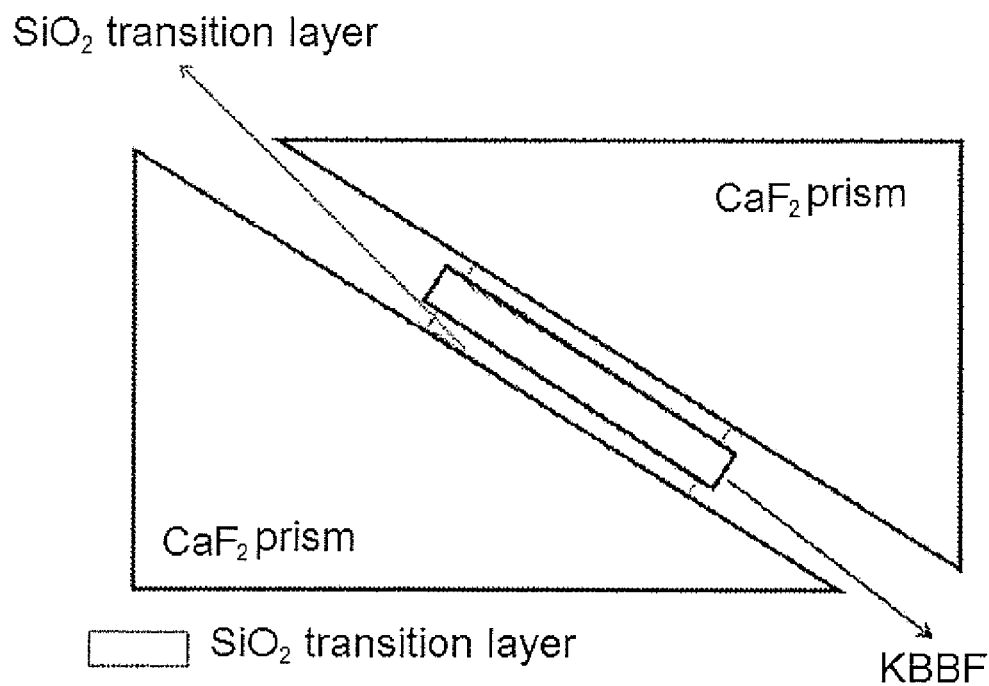

In this embodiment, the KBBF-$CaF_2$ crystal-prism coupler shown in FIG. 4 is fabricated by a way similar to Embodiment 1. Embodiment 6 is different from Embodiment 1 in that: the transition layers deposited on the surfaces of the KBBF crystal and $CaF_2$ crystal prisms are $SiO_2$ films; and the $SiO_2$ films are in thickness of 300 nm-320 nm for the application of coherent light output of 193 nm. Vapor deposition is applied to the four $SiO_2$ films by ion beam assisted electron beam evaporation. The $SiO_2$ films are activated by mechanical polishing. Thereafter, the two coated surfaces of the KBBF crystal optically contact with the $CaF_2$ crystal prisms through the $SiO_2$ films on respective surfaces, respectively. The bonded crystal-prism coupler is clamped firmly at two ends with a certain force by a clamp. The coupler is then heated in a furnace at 110° C. for 70 hours in air. The KBBF-$CaF_2$ crystal-prism coupler in this embodiment is fabricated by deeply optical contact.

Embodiment 7

The Deeply Optical Contact of Two KBBF Crystals

Figure 5:
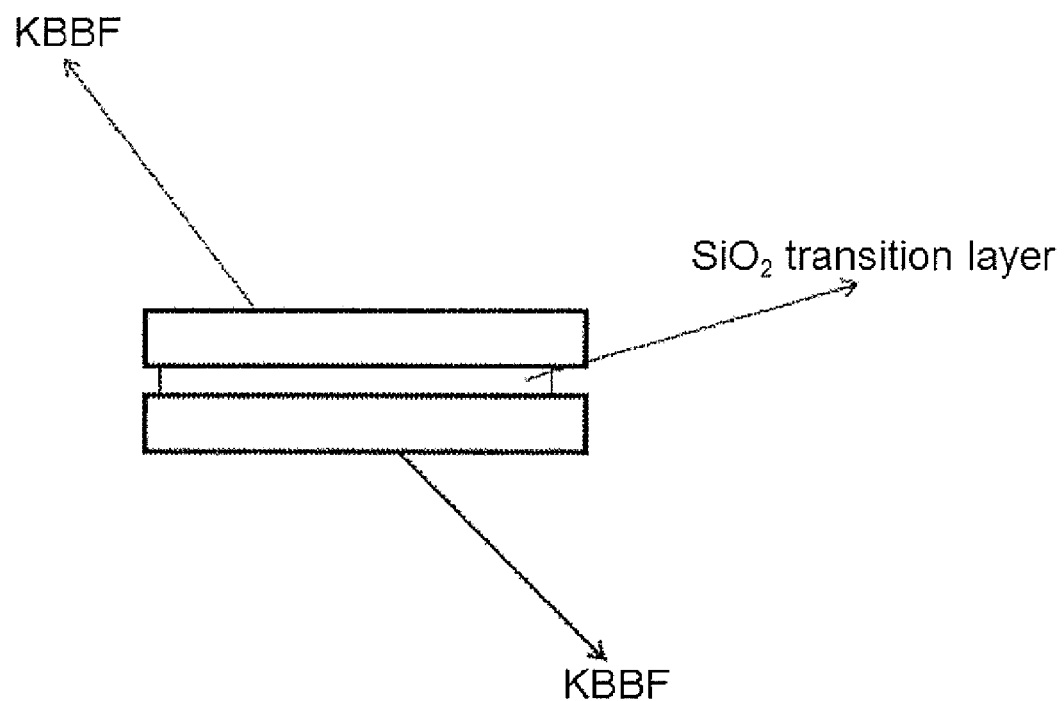
FIG. 5 shows an assembly of two KBBF family crystals formed by optical contact through transition layers.

The deeply optical contact of two KBBF crystals shown in FIG. 5 is performed by the following process. Each of two KBBF crystals has a thickness of 2 mm. Optical contact surfaces of the two KBBF crystals are deposited respectively by a $SiO_2$ film. The $SiO_2$ films are in thickness of 950 nm-1000 nm for the application of coherent light output of 177.3 nm-600 nm by matching prisms with various angles. The $SiO_2$ films can be deposited by ion beam assisted electron beam evaporation or laser ablation. The two $SiO_2$ films are activated by mechanical polishing. The two coated surfaces of the KBBF crystals are then optically contacted to each other through the $SiO_2$ films. Thereafter, the coupler is heated in a furnace at 600° C. for 1 hours in air. A block of KBBF crystal is formed with a thickness of 4 mm in this embodiment. It is obvious for those skilled in the art to combine several pieces of KBBF crystals by this method.

In the present invention, transition layers are deposited onto KBBF family crystals and prisms and the crystals and prisms are then optically bonded through the activated transition layers. The bonding force of the deep optical contact of the present invention is much stronger than that of direct optical contact.

Although the KBBF family nonlinear optical crystal-prism coupler and its fabrication according to the present invention have been described with reference to the above preferable embodiments, the present invention is not limited thereto. Those skilled in the art will appreciate that various change, replacement and modification may be made to the embodiments without departing from the principle and spirit of present invention, and the scope of the present invention is limited solely by the appended claims and its equivalents.

What is claimed is:

1. A KBBF family nonlinear optical crystal-prism coupler, comprising: a KBBF family crystal with two smooth surfaces; transition layers each of which is deposited on respective one of the two smooth surfaces of the KBBF family crystal; and two prisms each of which optically contacts with respective one of the activated transition layers, wherein the transition layers are in thickness of 200 nm-1000 nm, and the materials of the transition layers and the prisms can be identical or different; the smooth surfaces of the KBBF family crystal are crystallographic c-plane; each of the smooth surfaces of the KBBF family crystal has a roughness of Ra less than 0.5 nm and a surface flatness less than 1/8 λ (λ=632.8 nm); and the KBBF family crystal is a single KBBF family crystal or a combination of several layers of KBBF family crystals, which are combined by optical contact through the transition layers, the transition layers are coatings of different materials from that of the KBBF family crystal.

2. The KBBF family nonlinear optical crystal-prism coupler according to claim 1, wherein the KBBF family crystal is $KBe_2BO_3F_2$ crystal, $RbBe_2BO_3F_2$ crystal or $CsBe_2BO_3F_2$ crystal.

3. The KBBF family nonlinear optical crystal-prism coupler according to claim 1, wherein the prisms are made of optical crystal or optical glass.

4. The KBBF family nonlinear optical crystal-prism coupler according to claim 3, wherein the optical crystal prisms are made of calcium fluoride and the optical glass prisms are made of fused silica glass.

5. The KBBF family nonlinear optical crystal-prism coupler according to claim 1, wherein the transition layers are formed of calcium fluoride or silicon dioxide.

6. A fabrication method for the KBBF family nonlinear optical crystal-prism coupler according to claim 1, comprising the steps of:
   processing two optical contact surfaces of a KBBF family crystal and optical contact surfaces of two prisms by fine polishing so that each of the fine-polished surfaces of the KBBF family crystal and the prisms has a roughness of Ra less than 0.5 nm and a surface flatness less than 1/8 λ (λ=632.8 nm);
   depositing the transition layers on both the fine-polished surfaces of the KBBF family crystal, in which the transition layers are in thickness of 200 nm-1000 nm and the materials of the transition layers and the prisms can be identical or different;
   activating the transition layers of the KBBF family crystal; and
   bonding the transition layers deposited on the KBBF family crystal and the optical contact surfaces of the prisms by optical contact and then heating the bonded crystal-prism coupler at an elevated temperature to ensure that the crystal and the prisms are bonded to each other firmly, thereby achieving the KBBF family nonlinear optical crystal-prism coupler,
   wherein the heating process is performed under 50-600° C. for 1-120 hours, the atmosphere of the heat treatment can be in air, inert, reducing or oxidizing gas.

7. The fabrication method according to claim 6, wherein the KBBF family crystal is $KBe_2BO_3F_2$ crystal, $RbBe_2BO_3F_2$ crystal or $CsBe_2BO_3F_2$ crystal.

8. The fabrication method according to claim 6, wherein the prisms are made of optical crystal or optical glass.

9. The fabrication method according to claim 8, wherein the optical crystal prisms are made of calcium fluoride and the optical glass prisms are made of fused silica glass.

10. The fabrication method according to claim 6, wherein the depositing process is chemical vapor deposition, physical vapor deposition or sputter deposition.

11. The fabrication method according to claim 6, wherein the activating process is plasma activation or mechanical polishing activation.

12. A KBBF family nonlinear optical crystal-prism coupler, comprising:
   a KBBF family crystal with two smooth surfaces;
   a pair of prisms each of which has a smooth surface;
   first transition layers each of which is deposited on respective one of the two smooth surfaces of the KBBF family crystal; and
   second transition layers each of which is deposited on a smooth surface of respective one of the pair of prisms, wherein
   the first transition layers deposited on both the smooth surfaces of the KBBF family crystal are optically bonded with the second transition layers deposited on both the smooth surfaces of the two prisms;
   the first and second transition layers are in thickness of 200 nm-1000 nm, the materials of the first and second transition layers and the KBBF family crystal are of different materials of the same type of optical substances, and the materials of the first and second transition layers and the prisms can be identical or different;
   the smooth surfaces of the KBBF family crystal are crystallographic c-plane;
   each of the smooth surfaces of the KBBF family crystal and the prisms has a roughness of Ra less than 0.5 nm and a surface flatness less than 1/8 λ (λ=632.8 nm); and
   the KBBF family crystal is a single KBBF family crystal or a combination of several layers of KBBF family crystals, which are combined by optical contact through the transition layers, the transition layers are coatings of different material from that of the KBBF family crystal.

13. The KBBF family nonlinear optical crystal-prism coupler according to claim 12, wherein the first and second transition layers are formed of calcium fluoride or silicon dioxide.

14. A fabrication method for the KBBF family nonlinear optical crystal-prism coupler according to claim 12, comprising the steps of:
   processing two optical contact surfaces of a KBBF family crystal and optical contact surfaces of two prisms by fine polishing so that each of the fine-polished surfaces of the KBBF family crystal and the prisms has a roughness of Ra less than 0.5 nm and a surface flatness less than 1/8 λ (λ=632.8 nm);
   depositing each of the first transition layers on respective one of the fine-polished surfaces of the KBBF family crystal and each of the second transition layers on respective one of the fine-polished surfaces of the prisms, in which the first and second transition layers are in thickness of 200 nm-1000 nm, the materials of the first and second transition layers and the KBBF family crystal are of different materials of the same type of optical substances, and the materials of the first and second transition Layers and the prisms can be identical or different;
   activating the first and second transition layers; and
   bonding one of the first transition layers deposited on the KBBF family crystal and the second transition layer of the respective prism by optical contact, bonding the other first transition layer and the second transition layer of the other prism by optical contact, and then heating the bonded crystal-prism coupler at an elevated temperature to ensure that the crystal and the prisms are bonded to each other firmly, thereby achieving the KBBF family nonlinear optical crystal-prism coupler,
   wherein the heating process is performed under 50-600° C. for 1-120 hours, the atmosphere of the heat treatment can be in air, inert, reducing or oxidizing gas.

15. The fabrication method according to claim 14, wherein the first and second transition layers are formed of calcium fluoride or fused silica.

16. The fabrication method according to claim 14, wherein the KBBF family crystal is $KBe_2BO_3F_2$ crystal, $RbBe_2BO_3F_2$ crystal or $CsBe_2BO_3F_2$ crystal.

17. The fabrication method according to claim 14, wherein the prisms are made of optical crystal or optical glass.

18. The fabrication method according to claim 17, wherein the optical crystal prisms are made of calcium fluoride and the optical glass prisms are made of fused silica glass.

19. The fabrication method according to claim 14, wherein the depositing process is chemical vapor deposition, physical vapor deposition or sputter deposition.

20. The fabrication method according to claim 14, wherein the activating process is plasma activation or mechanical polishing activation.

21. The KBBF family nonlinear optical crystal-prism coupler according to claim 12, wherein the KBBF family crystal is $KBe_2BO_3F_2$ crystal, $RbBe_2BO_3F_2$ crystal or $CsBe_2BO_3F_2$ crystal.

22. The KBBF family nonlinear optical crystal-prism coupler according to claim 12, wherein the prisms are made of optical crystal or optical glass.

23. The KBBF family nonlinear optical crystal-prism coupler according to claim 22, wherein the optical crystal prisms are made of calcium fluoride and the optical glass prisms are made of fused silica glass.

\* \* \* \* \*

UNITED STATES PATENT AND TRADEMARK OFFICE
CERTIFICATE OF CORRECTION

| | | |
|---|---|---|
| PATENT NO. | : 8,773,750 B2 | Page 1 of 1 |
| APPLICATION NO. | : 14/115261 | |
| DATED | : July 8, 2014 | |
| INVENTOR(S) | : Chuangtian Chen et al. | |

It is certified that error appears in the above-identified patent and that said Letters Patent is hereby corrected as shown below:

On the Title Page

(57) Abstract, line 11　　　　　　　　　　Delete "surfaces",

Insert --surface--

In the Claims

Col. 10, line 53, Claim 14　　　　　　　　Delete "Layers",

Insert --layers--

Signed and Sealed this
Twenty-eighth Day of June, 2016

Michelle K. Lee
*Director of the United States Patent and Trademark Office*